(12) United States Patent
Primm et al.

(10) Patent No.: US 10,129,611 B2
(45) Date of Patent: Nov. 13, 2018

(54) SYSTEM AND METHOD FOR MONITORING SENSOR OUTPUT

(71) Applicant: RF Code, Inc., Austin, TX (US)

(72) Inventors: Michael Primm, Austin, TX (US); Richard Jefts, Cedar Park, TX (US); Martin Stich, Austin, TX (US)

(73) Assignee: RF CODE, INC., Austin, TX (US)

( * ) Notice: Subject to any disclaimer, the term of this patent is extended or adjusted under 35 U.S.C. 154(b) by 45 days.

(21) Appl. No.: 14/499,168

(22) Filed: Sep. 27, 2014

(65) Prior Publication Data
US 2016/0094898 A1 Mar. 31, 2016

(51) Int. Cl.
*G08B 19/00* (2006.01)
*H04Q 9/00* (2006.01)

(52) U.S. Cl.
CPC ......... *H04Q 9/00* (2013.01); *H04Q 2209/823* (2013.01)

(58) Field of Classification Search
None
See application file for complete search history.

(56) References Cited

U.S. PATENT DOCUMENTS

| | | | |
|---|---|---|---|
| 6,480,809 B1 * | 11/2002 | Slaight | G05B 23/0235 702/118 |
| 7,975,156 B2 | 7/2011 | Adman et al. | |
| 8,053,926 B2 | 11/2011 | Lehmann et al. | |
| 8,113,010 B2 | 2/2012 | Carlson | |
| 8,249,825 B2 | 8/2012 | VanGilder et al. | |
| 8,249,841 B1 | 8/2012 | Ferrer et al. | |
| 8,295,047 B1 | 10/2012 | Hamburgen et al. | |
| 8,327,656 B2 | 12/2012 | Tutunoglu et al. | |
| 8,590,333 B2 | 11/2013 | Carlson et al. | |
| 8,596,079 B2 | 12/2013 | Beam | |
| 8,600,560 B2 | 12/2013 | Smith et al. | |
| 8,725,307 B2 | 5/2014 | Healey et al. | |
| 8,749,187 B2 | 6/2014 | Busch et al. | |
| 8,764,527 B2 | 7/2014 | Donovan et al. | |
| 8,783,336 B2 | 7/2014 | Slessman | |
| 8,817,465 B2 | 8/2014 | Campbell et al. | |
| 8,817,474 B2 | 8/2014 | Campbell et al. | |
| 8,825,451 B2 | 9/2014 | ValGilder et al. | |
| 8,842,420 B2 | 9/2014 | Driggers | |
| 8,842,430 B2 | 9/2014 | Hellriegel et al. | |
| 8,842,433 B2 | 9/2014 | Koblenz et al. | |
| 8,941,992 B2 | 1/2015 | Moss | |
| 8,949,091 B2 | 2/2015 | Bhagwat et al. | |
| 8,961,279 B2 | 2/2015 | Tagaki et al. | |
| 8,965,748 B2 | 2/2015 | Iyengar et al. | |
| 8,972,217 B2 | 3/2015 | VanGilder et al. | |
| 8,977,514 B2 * | 3/2015 | Itani | G08B 17/12 702/130 |

(Continued)

*Primary Examiner* — Brian Zimmerman
*Assistant Examiner* — Kevin Lau
(74) *Attorney, Agent, or Firm* — Larson Newman, LLP

(57) ABSTRACT

A monitoring system can receive sensor measurements from a select sensor of a group of sensors. The sensor measurements are compared to group alert condition or an individual alert condition. Based on the comparison, an alert state can be identified and a user notified of the alert state. The system can automatically determine the individual alert condition, which can be uniquely associated with the select sensor and can be associated with a domain of time.

19 Claims, 6 Drawing Sheets

(56) References Cited

U.S. PATENT DOCUMENTS

| | | |
|---|---|---|
| 8,978,401 B2 | 3/2015 | Chainer et al. |
| 8,983,674 B2 | 3/2015 | Manzer |
| 8,988,879 B2 | 3/2015 | Hamburgen et al. |
| 8,991,198 B2 | 3/2015 | Kearney et al. |
| 8,996,193 B2 | 3/2015 | Manzer |
| 9,033,776 B2 | 5/2015 | Kinoshita |
| 9,043,035 B2 | 5/2015 | Chainer et al. |
| 9,052,722 B2 | 6/2015 | Chainer et al. |
| 9,055,697 B2 | 6/2015 | Lyon |
| 9,060,451 B2 | 6/2015 | Clidaras |
| 9,066,450 B2 | 6/2015 | Bednarcik et al. |
| 9,069,534 B2 | 6/2015 | Rodgers |
| 9,091,496 B2 | 7/2015 | Imwalle et al. |
| 9,107,327 B2 | 8/2015 | Chainer et al. |
| 9,110,476 B2 | 8/2015 | David et al. |
| 9,115,916 B2 | 8/2015 | Totunoglu et al. |
| 9,116,536 B2 | 8/2015 | Hellriegel et al. |
| 9,116,897 B2 | 8/2015 | Rowan et al. |
| 9,119,326 B2 | 8/2015 | McDonnell et al. |
| 9,125,327 B1 | 9/2015 | Carlson et al. |
| 2011/0145631 A1* | 6/2011 | Shankar ............. G06F 11/0709 714/4.11 |
| 2015/0021005 A1* | 1/2015 | Land, III ............. F24F 11/0012 165/214 |
| 2016/0066068 A1* | 3/2016 | Schultz ................... H04Q 9/00 340/870.07 |

* cited by examiner

SYSTEM AND METHOD FOR MONITORING SENSOR OUTPUT

FIELD OF THE DISCLOSURE

This disclosure, in general, relates to systems and methods for monitoring measurements from sensors.

BACKGROUND

With the rise of the Internet, reliance on server clusters and cloud-based storage facilities has increased. Such increased reliance has led to higher demands for equipment performance and reliability. As such, managers of the server clusters and data storage facilities are increasingly concerned about the environment experienced by the servers and hard drives.

Similarly, with increased globalization of commerce, sensitive products are increasingly being shipped long distances and stored in warehouses. To maintain quality and decreased damage to products, tracking the environment experienced by such products is of increased interest.

In either case, there is an increased interest in monitoring systems that can identify conditions that would lead to product or equipment damage. Early identification of such conditions can lead to higher product quality or longer equipment life, lowering costs and increasing return on investment.

SUMMARY

In an example, a monitoring system can receive sensor measurements from a select sensor of a group of sensors. The sensor measurements are compared to group alert condition or an individual alert condition. Based on the comparison, an alert state can be identified and a user notified of the alert state. The system can automatically determine the individual alert condition, which can be uniquely associated with the select sensor and can be associated with a domain of time.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a monitoring system receives measurements from a group of sensors. The monitoring system can archive historical measurements received from the group of sensors and can receive ongoing measurements from sensors within the group of sensors. In an example, a group alert condition, such as a group threshold condition, is established and associated with each of the sensors of the group. In a further example, individual alert conditions, such as individual threshold conditions, can be automatically established and uniquely associated with a select sensor of the group of sensors. In particular, individual alert conditions can be uniquely associated with each sensor of the group of sensors. When a sensor measurement is received from a select sensor of the group of sensors, the sensor measurement can be compared to the group alert condition or the individual alert condition associated with the select sensor. Based on the comparison, an alert state can be identified and a communication can be sent to notify a user.

In a particular example, the individual alert condition can be associated with a domain of time, such as a fixed duration within a period or a duration during which conditions measured by a select sensor are expected to be consistent (i.e., a domain of consistency). In an example, the individual alert condition can be determined from an average of measurements historically received from the select sensor during the domain or from a variance quantity, such as variance or standard deviation, determined from the measurements.

In a particular example, a system for monitoring sensor measurements can include a group of sensors, a reader to received measurements from the group of sensors, and monitoring device. The monitoring device can be in communication with user interface devices and can provide alerts to the user interface devices in response to alert states identified through the group alert condition or individual alert conditions.

Figure 1:
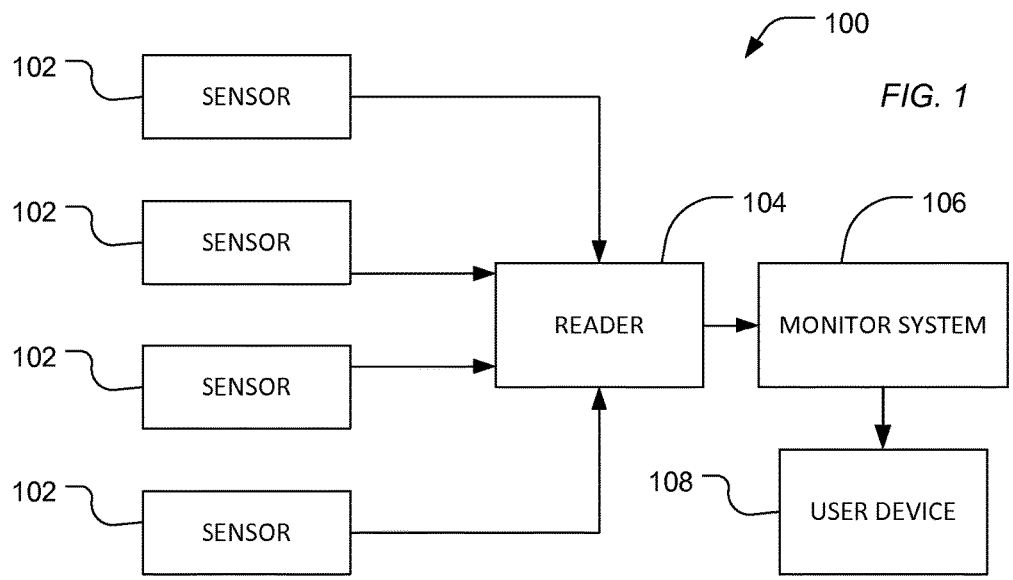
FIGS. 1 and 2 include illustrations of exemplary monitoring systems.

For example, as illustrated in FIG. 1, an exemplary system 100 includes a group of sensors 102. The sensors 102 can measure a state or environment associated with a system or can measure other factors indicative of system performance and can communicate such measurements to a reader 104. For example, the group of sensors 102 can measure temperature, such as a temperature at a position within a rack of servers. In another example, the sensors can measure humidity, the presence of water, a water level, or any combination thereof. In the context of a server system, exemplary sensors can measure fan usage, fan speed, CPU usage, system temperature, power usage, network traffic, or any combination thereof.

The sensors 102 can communicate with the reader 104. In an example, the sensors 102 are directly connected to the reader 104, such as through a wired connection, or are indirectly connected, such as through a bus or network. In a particular example, the sensors 102 are connected to the reader 104 through a network, such as a wired network or a wireless network. For example, the sensors 102 are connected to the reader 104 through a wireless network. Exemplary wired connections can include a bus connection, such as a universal serial bus (USB) connection, or can include a network, such as an Ethernet-based network, or any combination thereof. Exemplary wireless networks include Bluetooth connections, Wi-Fi connections, WiMAX connections, cellular connections, or various other connections using wireless protocols, such as those of IEEE 802.11x, or any combination thereof. The sensor 102 can communicate measurements periodically or can communicate measurements upon a change in value.

The reader 104 can be connected to the monitoring device 106 and can transfer measurements received from the sensors 102 to the monitoring device 106. In an example, the reader 104 can communicate with the monitoring device 106 through a wired or wireless connection, such as those described above. The monitoring device 106 can receive the measurements from the sensors 102 and establish group alert conditions and individual alert conditions associated with sensors of the group of sensors. When new measurements are received, the monitoring system 106 can compare the measurements to the group alert conditions or the individual alert conditions and determine an alert state. For example, the alert state can be a measurement violating a threshold. When an alert state is identified, the monitoring system can communicate with the user interface 108 to notify a user. For example, the user interface 108 can include a display or an auditory device.

In an example, the monitoring device 106 can be a central server that receives sensor readings from a variety of sensor sources, either periodically or whenever a sensor's reading changes from that previously reported. The central server can maintain a copy of the sensor data, including both the current (or most recently reported) value of the sensor, and a recorded history of each sensor's values (either as a series of periodic values, or as a series of distinct values representing ranges of time when the sensor was at a given value). The central server can also provide a mechanism to allow the definition of at least one threshold for each sensor, allowing such thresholds to be used to generate alerts, alarms, notifications or other responses when the current value of a given sensor fails to conform to the constraint defined by, for example, the threshold (e.g. it exceeds a given value; it drops below a given value for a given period of time; etc.).

The user interface 108 can be directly connected to the monitoring device 106 or can be connected to the monitoring device 106 using a communications network. Exemplary alert notifications can be sent to remote devices through a network, such as an Ethernet-based network, a cellular network for mobile phones, or a wireless data network, or any combination thereof. Alternatively, the user interface 108 can be directly connected to the monitoring device 106.

Figure 2:
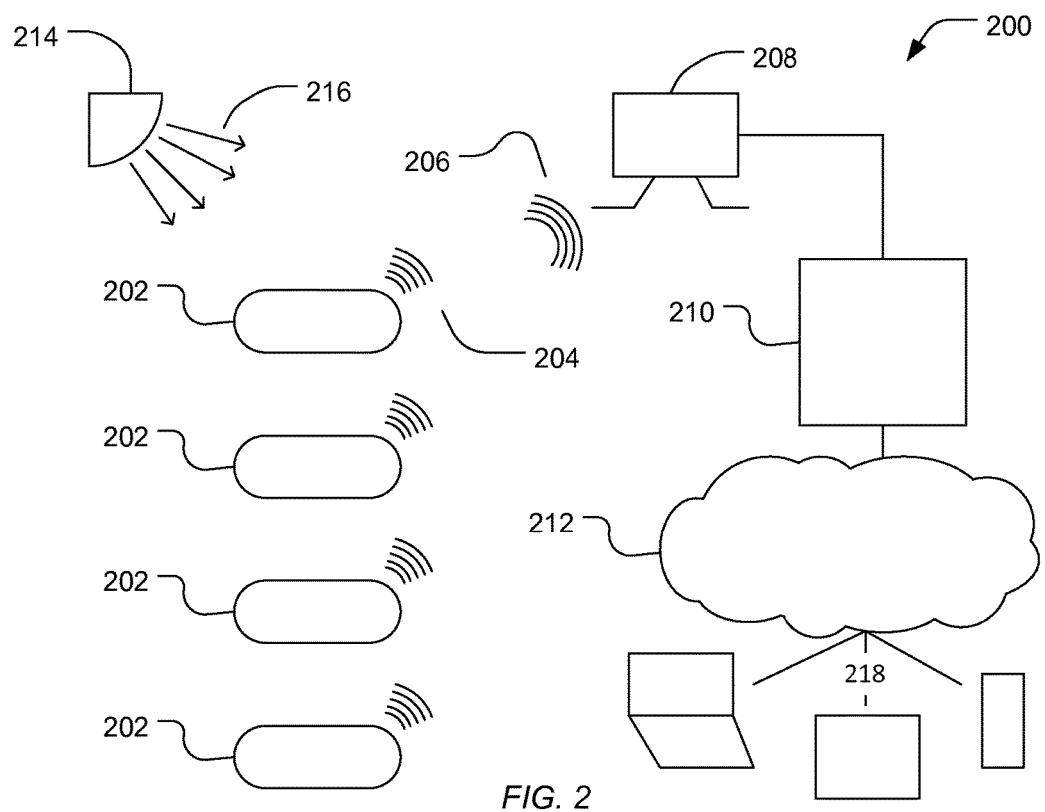

In a particular example, the sensors can be incorporated into tags associated with equipment or containers. Optionally, such tags can communicate both the sensor measurements and a location associated with the equipment or container to which the tag is attached. For example, as illustrated in FIG. 2, a group of tags 202 including sensors can be associated with equipment or containers. In a particular example, the tags 202 can be associated with server equipment within a server rack. In another example, the tags 202 can be associated with shipping containers. In a further example, the tags 202 can be associated with boxes or containers stored in a warehouse. In an additional example, the tags 202 can be associated with equipment within a facility, such as an office, a medical facility, or combination thereof.

The tags 202 can communicate with a reader 208 using a wireless communication protocol 204. For example, the tags 202 can communicate sensor measurements transmitted using a protocol 204 received at 206 by an antennae of the reader 208.

Optionally, the system 200 can include a location beacon 214, providing a location signal 216 to the tags 202. In such an example, the tags 202 can incorporate the location received from the location signal 206 into the communication 204 provided to the reader 208, providing the reader 208 with both the sensor measurement and a location.

The tags 202 can communicate using a standard wireless protocol, such as those identified under IEEE 802.11x or can utilize a proprietary communication protocol. The reader 208 can communicate the sensor measurements and associated locations with the monitoring device 210. The monitoring device 210 can monitor the location of the tag 202 or the sensor measurements to determine alert states. For example, the monitoring device 210 can observe historical measurements over a set of periods, established domains within a period, and establish both group alert conditions and individual alert conditions associated with the domain within the period. For example, a period can be a duration that includes one or more domains. A duration is a quantification of a continuous extent of time. A domain can include a duration within the period during which the conditions measured by the sensor are expected to be consistent. In an example, a period can be a week and a domain can be a weekday or a weekend day. In another example, the period can be a week and the domain can be morning hours during weekdays, for example, in which web traffic is expected to increase or can be late afternoon hours of a particular weekday, such as Friday. In another example, the domain can be a duration late at night during each day of the week when a system is expected to perform backups.

For example, the measurements during each hour of the day, combined across the N days can be processed, producing 24 sets of values-one for the measurements during the times 12:00-12:59:59, one for 1:00-1:59:59, etc. In another example, the measurements during each hour of the day for each day of the week (Sunday, Monday, etc.), combined across the N weeks can be processed, producing 168 sets of values (24 hours/day times 7 days/week), one combining the values of the measurements for each distinct hour on each day of the week (e.g. the average for the hour of 1 pm on Monday across the N weeks processed). In a further example, other periodic intervals and divisions (i.e., domains) of the periods can be utilized: daily vs hourly periods, monthly vs weekly vs annual intervals.

In particular, the monitoring device can determine a set of domains within a period and establish individual alert conditions uniquely associated with each sensor of a group of sensors within an identified domain. When new measurements are received by the monitoring device 210, the monitoring device 210 can compare the new measurements to group alert conditions and individual alert conditions to determine an alert state. The monitoring device 210 can communicate the alert state to a user device.

In particular, the monitoring device 210 can communicate with a user interface through a network 212, such as a local area network, a wide area network, the Internet or a wireless data network, or a combination thereof. In particular, the monitoring device 210 can communicate with a remote user interface device 218, such as a mobile device, mobile phone, laptop, tablet, or any combination thereof, through a network or networks 212. Alternatively, the user interface device 218 can be directly connected to the monitoring device 210.

Figure 3:
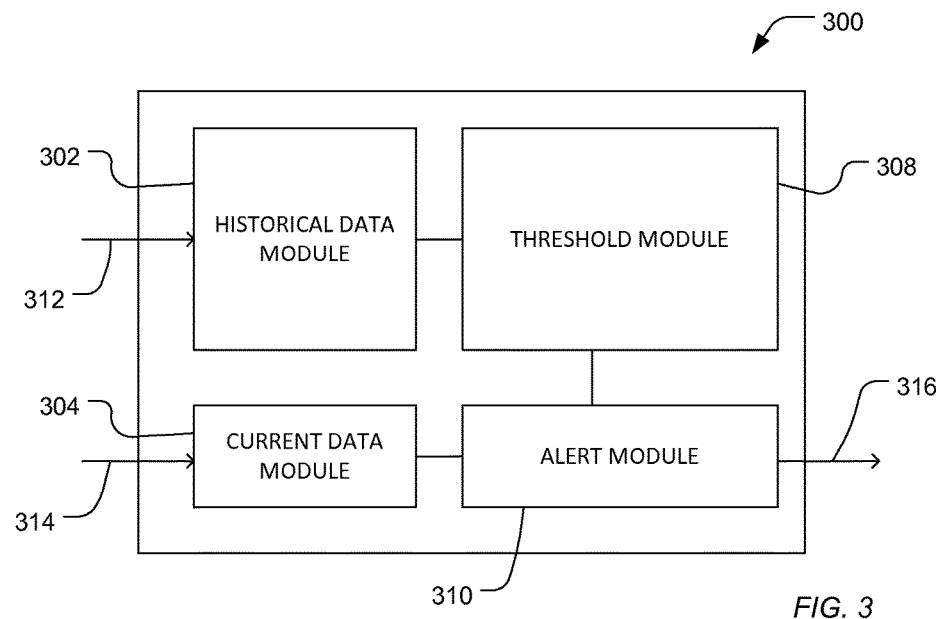
FIG. 3 includes an illustration of an exemplary monitoring device.

Turning to FIG. 3, an exemplary monitoring device 300 can include a historical measurement module 302, a conditions module 308, a current measurement module 304, and an alert module 310. In an example, the conditions module 308 can establish group alert conditions to be associated with each of the sensors with in a group of sensors. The group alert conditions can be established based on equipment parameters, such as operating temperature ranges. In another example, the group alert condition can be established based on historical measurements from the group of sensors. The conditions module 308 can establish individual alert conditions associated with domains within periods based on measurements from the historical measurement module 302. For example the threshold module 308 can established domains within a period, establish individual alert conditions, such as individual thresholds, uniquely associated with a select sensor during the establish domain. The alert condition can adjust over time based on a moving window of historical measurements (e.g., a 90-day moving average).

As current measurements are received at the current measurements module 304, the current measurements can be evaluated by the alert module 310, which accesses the group alert conditions and the individual alert conditions from the threshold module 308 to determine that an alert state exists. An exemplary alert state can includes a measurement, such as a temperature or humidity, violating a threshold, which may be indicative of a problem within the system being observed. The alert module 310 can communicate alert states to a user interface at 316.

In a particular example, the monitoring device 300 can include computational circuitry, such as processors and electronic storage, to implement one or more modules. The modules may be directly connected, connected by a bus, or can be connected through the use of shared memory or storage within the computational system. Communications 312, 314, or 316 can be performed using interfaces, such as network interfaces or user interfaces, or direct wired interfaces.

Figure 4:
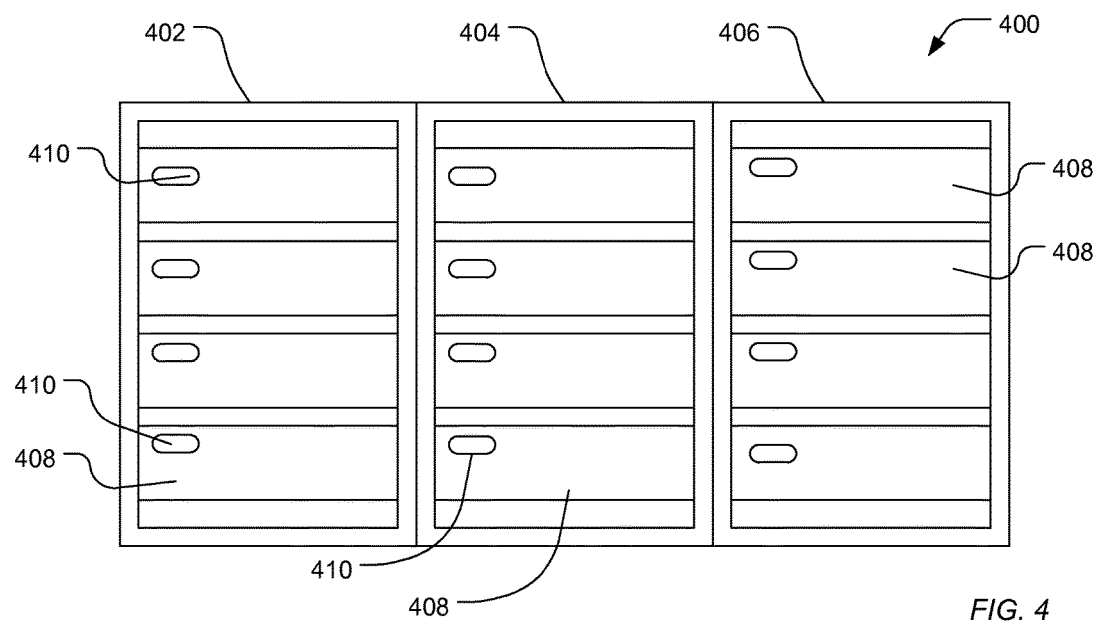
FIG. 4 includes an illustration of an exemplary server facility.

In a particular example, such a monitoring system can be used to monitor the performance or environmental conditions in a server room. For example, FIG. 4 includes a set of server racks 402, 404, and 406 housing servers and computer equipment 408. A set of sensors 410 can be connected to the servers and computational equipment 408 or can be connected at locations within the racks 402, 404, or 406. In an example, the sensors 410 can measure temperature. In another example, the sensors 410 can measure humidity. In a further example, the sensors 410 can be built into the equipment 408. For example, the sensors 410 can measure internal temperature, power usage, fan speed, fan usage, CPU usage, network traffic, or any combination thereof.

Such measurements can be relayed to a reader and a monitoring device. For example, a monitoring device can monitor the temperature at locations within a server rack to identify problems associated with cooling computer equipment. In another example, the monitoring device can monitor a combination of internal temperature and fan usage to establish alert conditions associated with cooling within the server racks. For example, in rack systems that utilize cool air flowing from the lower end of the rack to an upper end of the rack, temperatures measured by sensors at the lower end of the rack may be lower than temperatures measured by sensors at the upper end of the rack. High or low temperatures associated with either sensor can indicate a problem with cooling circulation. In another example, increased usage of fans or high internal temperature may indicate poor distribution of computational demand or a problem with airflow associated with an individual piece of equipment in the server rack.

Figure 5:
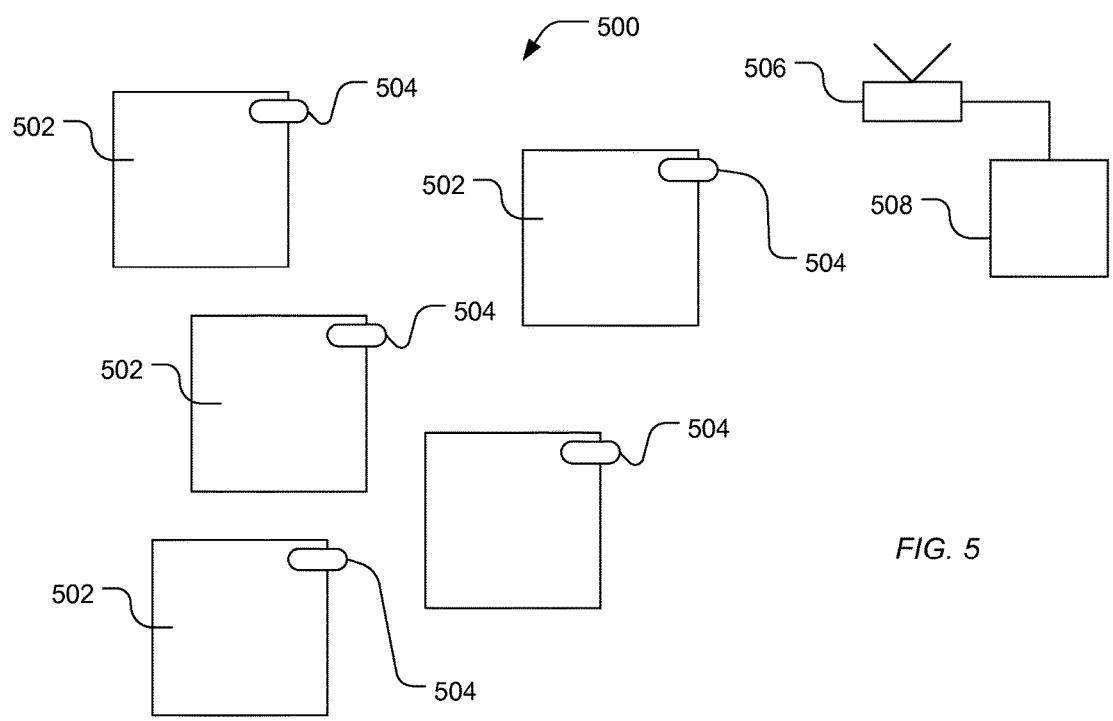
FIG. 5 includes an illustration of an exemplary storage facility.

In another example, sensors can be associated with containers stored within a storage facility, such as a warehouse. For example, FIG. 5 illustrates a system 500 in which tags 504 including a sensor are associated with containers 502. Information from the tags including sensor measurements and optionally location are transmitted from the tags 504 to a reader 506 and forwarded to a monitoring device 508. In an example, the tags 504 can monitor humidity. In another example, the tags 504 can monitor temperature, either internal or external to the container 502. As such, cooling problems within a region in the warehouse or problems with a specific container 502 can be identified using the measurements from the tags 504.

Figure 6:
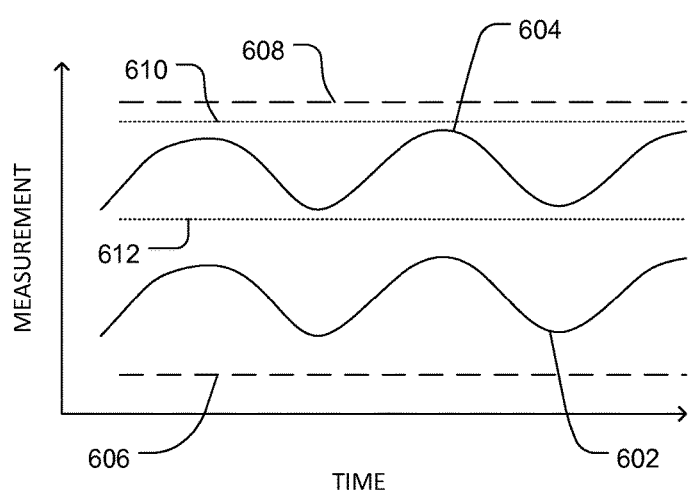
FIGS. 6, 7, and FIG. 8 include graphs of exemplary sensor measurements.

Measurements received from individual sensors can vary based on location, associated package or equipment, variability in calibration of the sensor, or other factors, or a combination thereof. Such variability among sensor measurements leads to the use of broad conditions when applied to a group of sensors. For example, FIG. 6 illustrates measurements received from two sensors 602 and 604 over time. In an example, the sensor 602 can be a temperature sensor at a lower position within a server rack than the sensor 604. In another example, the sensor 602 may be a temperature sensor located at a different position within a warehouse than a temperature sensor 604. To account for variations within the norm and between sensors of a group of sensors, a group alert condition is set broadly to encompass the expected variance of each of the sensors. For example, an upper group threshold 608 and a lower group threshold 606 are set broadly. The upper group threshold 608 is above the expected normal highs of operation of the sensor measurements 604, and the lower group threshold 606 is set below the expected normal lows of the lowest sensor measurements 602. As such, when group thresholds are established, they may account for the highest measurements from a first sensor and the lows of the measurements received from a second sensor. Alternatively, the group threshold can be set based on equipment specifications (e.g., server equipment with operating specifications of 50° F. to 80° F.).

In contrast, when individual alert conditions are established for individual sensors, the range of acceptable measurements is reduced. As illustrated in FIG. 6, an upper threshold 610 and a lower threshold 612 associated with the measurement of a select sensor 604 for a given period or domain with the period can have a narrower range than the threshold 606 and 608 established for a group of sensors. The range of the individual thresholds, i.e., the difference between an upper threshold and a lower threshold, can be less than the range of the group thresholds. For example, the range of the individual thresholds can be not greater than 50% of the range of the group thresholds, such as not greater than 20% or not greater than 10% of the range of the group thresholds.

For example, a specific sensor measuring cool air supplied to a specific rack may (historically) have always measured from 55° F. to 60° F. When this sensor suddenly jumps to 70° F. (a still allowable value, given an equipment specification of 50° F. to 80° F.), it very likely indicates some abnormal condition in the data center (e.g. a malfunctioning fan, a tile on a raised floor left open, a blocked vent) that is equally warranting corrective action.

Figure 7:
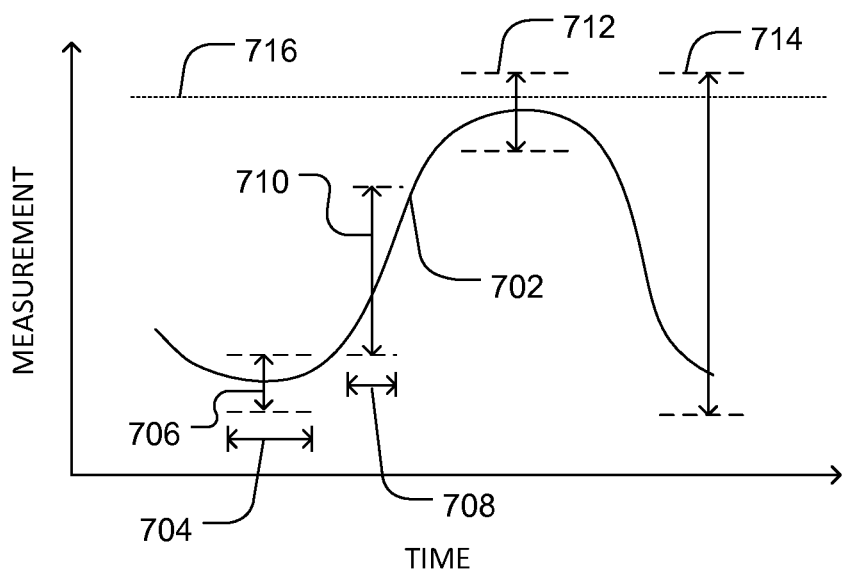

In another example illustrated in FIG. 7, individual alert conditions can be established for measurements 702 from a single sensor of the group of sensors. When establishing individual alert conditions, such as individual thresholds, an individual alert condition can be established for the full range of measurements within a period. Alternatively, alert conditions, such as thresholds, can be established for the individual sensor within smaller domains within the period. For example, for measurement values 702 within an established domain 704, a set of thresholds 706 can be determined and applied. The domains can represent consecutive or tandem durations within a period. In another example, the domains can represent durations in which the condition measured by the sensor is expected to be consistent, such as having a similar average and similar variance quantity. As such, each domain can extend for a different duration.

As illustrated, a first domain 704 can extend for a longer duration than a second domain 708. For example, when conditions measured by the sensor are expected to be consistent for a longer duration, a domain 704 can be established over the duration, providing a narrow set of individual thresholds 706. During durations in which conditions are expected to vary significantly, a shorter domain 708 can be applied and a larger range of thresholds 710 can be utilized. In an example, the domains can be consecutive segments of time. The segments can be of the same duration or can be of different durations. In particular, narrower alert conditions, such as alert conditions 706 and 712 can be established for different domains within a period. As illustrated, alert conditions 706 and 712 are applied during domains of similar variance, but have different averages. In such examples, the domains provide a dynamic adjustment of alert conditions associated with a select sensor based on the expect changes in the environment measured by the select sensor. Alternatively, a single alert condition 714 established for all domains with the period.

In a particular example, during a domain 704, the individual alert condition is narrower and lies within the bounds of a group alert condition. In an alternative example, the individual alert condition 712 within a particular domain can include limits that exceed an established group threshold 716. As such, both the individual alert condition and a group alert condition provide value in that the expected behavior of a select sensor during a particular domain may exceed the acceptable measurements for a group of sensors. As such violation of one of individual alert conditions or of the group alert conditions can result in an alert state that leads to a communication with the user.

Figure 8:
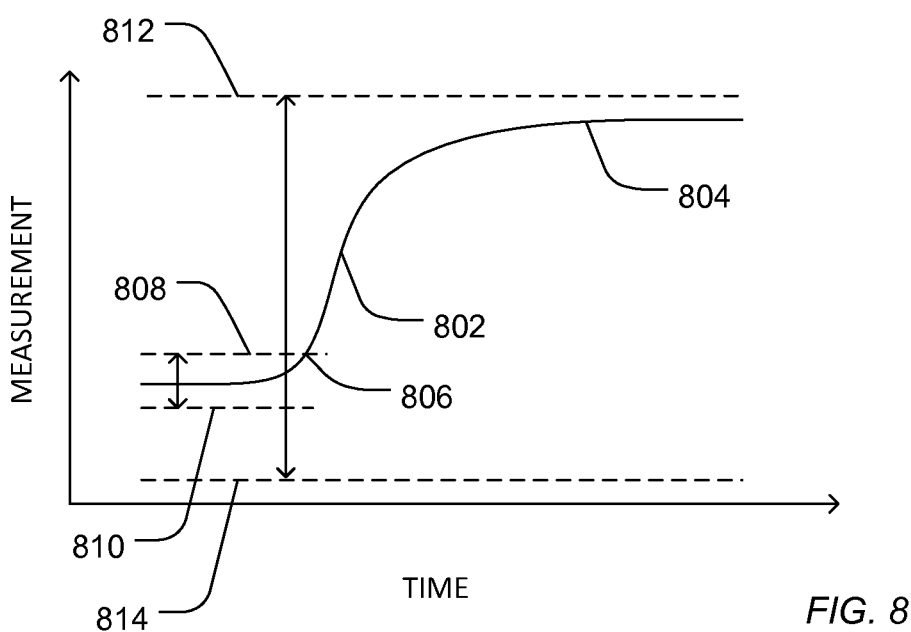

Individual alert conditions find further use in systems in which a steady-state value of a given alert state may not exceed the alert condition established for group, yet indicate some problem within the environment that the sensor measures. For example, as illustrated in FIG. 8, sensor measurements 802 may be bounded by individual alert conditions, such as thresholds 808 and 810, as well as a set of group alert conditions, such as thresholds 812 or 814. When a problem occurs, the measurement received from the sensor 802 may exceed the individual threshold 808 indicating a problem state. However, the measurement may reach a steady-state at 804, which does not exceed the group alert condition 812. In particular examples in which the group alert condition is set based on operating parameters associated with equipment, a sensor measurement steady-state 804 may indicate a problem within the system that does not violate the equipment operating settings, but nevertheless, indicates a problem with the system. As such, the problem identification can occur quicker, more accurately, or more precisely using individual alert conditions.

For example, an equipment specification may specify an operating temperature of 50° F. to 80° F. A specific sensor measuring cool air supplied to a specific rack may (historically) have always measured from 55° F. to 60° F. When this sensor suddenly jumps to 70° F. (a still allowable value), the change likely indicates an abnormal condition in the data center (e.g. a malfunctioning fan, a tile on a raised floor left open, a blocked vent) that is equally warranting corrective action.

For example, when measuring temperature, an increase in temperature beyond the norm for an individual sensor may indicate a partially blocked air-conditioning vent or displaced tile. Such a problem may not cause immediate damage to equipment, but may over time lead to faster failure modes of the equipment.

Figure 9:
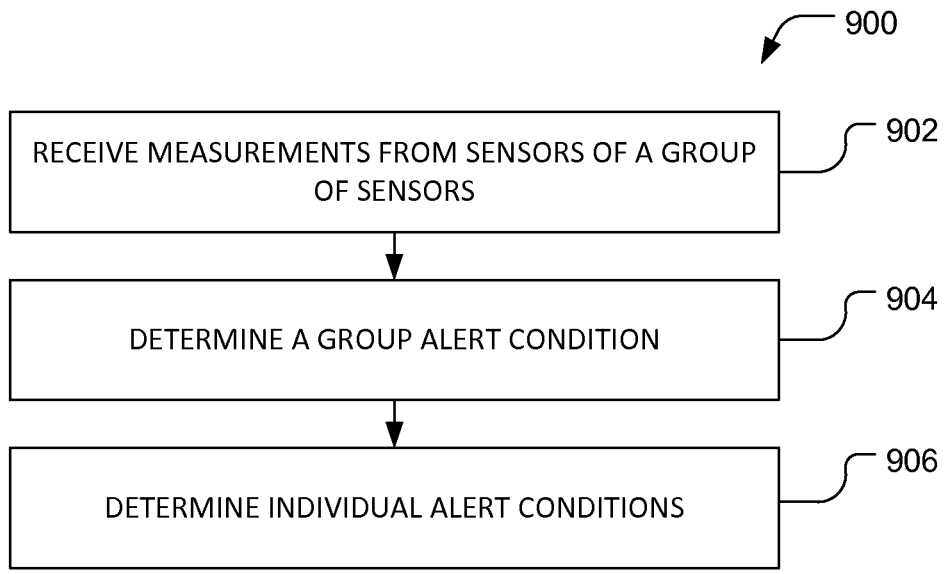
FIGS. 9, 10, and FIG. 11 include block flow diagrams illustrating exemplary methods for monitoring sensor output.

An exemplary method for monitoring a group of sensors includes receiving measurements from sensors of the group of sensors and determining threshold values to associate with the group and with the individual sensors. For example, as illustrated in FIG. 9, a method 900 includes receiving measurements from sensors of a group of sensors, as illustrated at 902. The sensors can measure temperature, humidity, fan usage, fan speed, CPU usage, power usage, network traffic, equipment temperature, or other factors, or any combination thereof. For example, the sensor can measure temperature. The sensors can transmit the measurements to the reader, which subsequently provides measurements to a monitoring device.

As illustrated at 904, a group alert condition, such as a group threshold, is determined. For example, historical measurements can be used to determine bounds to be applied to all the sensors within the group of sensors. In another example, a group alert condition can be applied based on the expected operating parameters of equipment associated with the sensors.

The measurements can be received over a set of periods. For example, a period can be a week, a day, or another extent of time depending upon the nature of the system being observed. In an example, the measurements can be received for a set of weeks when the period is a week or a set of days when the period is a day.

As illustrated at 906, individual alert conditions, such as individual thresholds, associated with a select sensor of the group of sensors can be determined. Individual alert conditions can be determined for a select sensor for the entire period or can be determined for domains within the period. For example, measurements can be received over a set of weeks and an individual threshold determined from measurements received from a select sensor during a set of hours (domain) within the week (period), hours within workdays, or hours with within a specific day of the week. Individual thresholds can be determined based on an average of historical measurements received during the domain within the set of periods over which measurements are received.

For example, the measurements during each hour of the day, combined across the N days can be processed, producing 24 sets of values—one for the measurements during the times 12:00-12:59:59, one for 1:00-1:59:59, etc. In another example, the measurements during each hour of the day for each day of the week (Sunday, Monday, etc.), combined across the N weeks can be processed, producing 168 sets of values (24 hours/day times 7 days/week), one combining the values of the measurements for each distinct hour on each day of the week (e.g. the average for the hour of 1 pm on Monday across the N weeks processed). In a further example, other periodic intervals and divisions (i.e., domains) of the periods can be utilized: daily vs hourly periods, monthly vs weekly vs annual intervals.

Individual thresholds can, for example, be based on an average value of measurements during the domain. The average can be a mean, median, or mode. In a particular example, the average is a mean of the measurements received. In another example, the average is the median. The average can be a moving average incorporating only historical measurement from a number of periods in the past. For example, the average can be a 90 day moving average, although other numbers of periods can be used. In addition or alternatively, the individual thresholds can be established based on a variance quantity associated with the measurements received during the domain over the set of periods.

For example, the variance quantity can be variance or can be standard deviation. In another example, the individual threshold can be established based on a maximum or minimum of historical sensor measurements. In each case, the individual threshold can be based on the average, maximum, or minimum plus or minus a constant or a multiple of the variance quantity.

In a particular example, an individual threshold associated with a select sensor during a domain can be determined based on the average plus/minus a constant or a multiple of the variance quantity. The multiple can be in a range of 1 to 10, such as a range of 2 to 7, or a range of 3 to 5, such as 4. In a particular example, the individual thresholds within a domain for a select sensor are set to a mean plus or minus four times the standard deviation. Depending upon the nature of the measurement, lower bounds may be placed at a different multiple of the variance quantity than upper bounds. In a further example, the individual threshold can be based on an average plus/minus a constant and plus/minus a multiple of the variance quantity.

In another example, the individual threshold can be based on a historical maximum or minimum, such as a maximum or minimum of measurements with a set of periods. For example, when a period is days, the individual threshold can be based on a maximum or minimum of 90 days. Other quantities of periods can be used for the historical measurements. In an example, the threshold can be set based on the maximum plus a constant or based on the maximum plus a multiple of the variance quantity. In another example, the threshold can be set based on the minimum minus a constant or based on the minimum minus a multiple of the variance quantity. The multiple can be a multiple as described above, such as 2 standard deviations. In an additional example, the individual threshold can be based on the maximum/minimum plus/minus a constant and a multiple of the variance quantity.

In a particular example, the system can report a threshold violation when the value of sensor A exceeds the sum of the average for sensor A for the last 30 days (Aavg30) and 4 times the standard deviation for sensor A for the last 30 days (Asigma30)—that is if A>(Aavg30+(4*Asigma30)). In another example, the system can report a threshold violation if the value of sensor A exceeds the sum of the maximum for sensor A for the last 90 days (Amax90) and the constant 5—that is, if A >(Amax90+5). In a further example, the system can report a threshold violation if the value of sensor A exceeds the sum of the median for sensor A for the last 30 days (Amedian30), 3 times the standard deviation for sensor A for the last 30 days (Asigma30), and the constant 3—that is if A>(Amedian30+(3*Asigma30)+3).

Further by using a moving average (e.g., 30 day average as above) or by using a moving window over which a maximum or minimum is established, the system provides for a slow update. For example, the system can differentiate between summer and winter norms. In another example, the system can adapt to changes within a building, such as gradual increasing demand on an A/C system, or adapt to changes to equipment usage, such as a gradual increase in server activity for a particular website or email server.

In particular, determining a threshold from statistically derived measurements for the history of the sensor allows (given that the nominal variability of the sensor's measurement is approximately Gaussian, or other distribution where smaller deviations are more likely than larger ones) the recognition of statistically significant deviation of the sensor's measurement from its "normal" range. Since each sensor's range is determined from its own history, and can be re-determined periodically to account for slow changes in that normal range, the resulting thresholds yield a much higher ability to accurately and promptly detect and report deviations from those normal conditions. By updating the measurements on a period shorter than the window of time used to determine the statistical measurements (daily updates with measurements derived from the last 7 or 30 days, for example) sudden or recent changes do not change the thresholds too quickly (possibly causing some changes to be treated as 'normal' too quickly).

Figure 10:
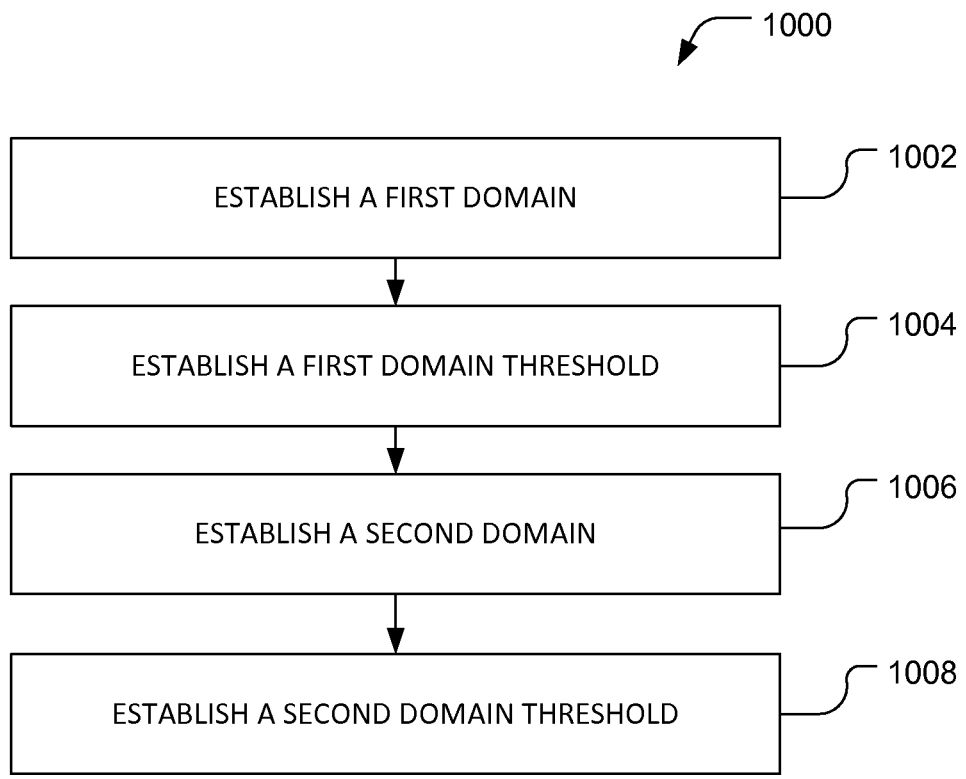

In particular, the monitoring device can establish individual alert conditions for multiple domains within a period for a select sensor. For example, as illustrated in FIG. 10, a method 1000 includes establishing a first domain, as illustrated at 1002. The domain can be established by a user based on the user's understanding of the system being monitored. In another example, the domains can be automatically determined based on durations in which the condition being monitored by the select sensor is consistent. As such, domains can extend for the same duration or can extend for a different duration. In a particular example, the system can establish a domain based on a duration exhibiting a similar variance profile and similar average. For example, the domain can be established for a first duration in which the measurements have a first variance, and a different domain can be established for second duration in which the measured values have greater variance or a different mean.

Once a first domain is established, a first domain threshold can be established to be associated with the first domain for the selected sensor, as illustrated at 1004. For example, the first domain threshold can be established based on an average of historical measurements within the first domain or a variance quantity, such as a variance or standard deviation, associated with the measurements from the select sensor during the first domain.

As illustrated at 1006, a second domain can be established. For example, the second domain can be established based on a domain of consistency different from the first domain. The second domain can have the same quantity of time or duration or can have a different duration than the first domain. As illustrated at 1008, a second domain threshold can be established for application during the second domain and associated with the select sensor. The method 1000 can be performed in a different order from that illustrated. For example, the system can establish a set of domains and subsequently establish domain thresholds for application within the established domains associated with a select sensor.

Between sensors within the group of sensors, the domains can be the same, but the individual alert conditions can be the same or different. In another example, the domains may be different between two sensors, for example, being different in number within a period, different in duration, or different in start or end times, or any combination thereof.

Figure 11:
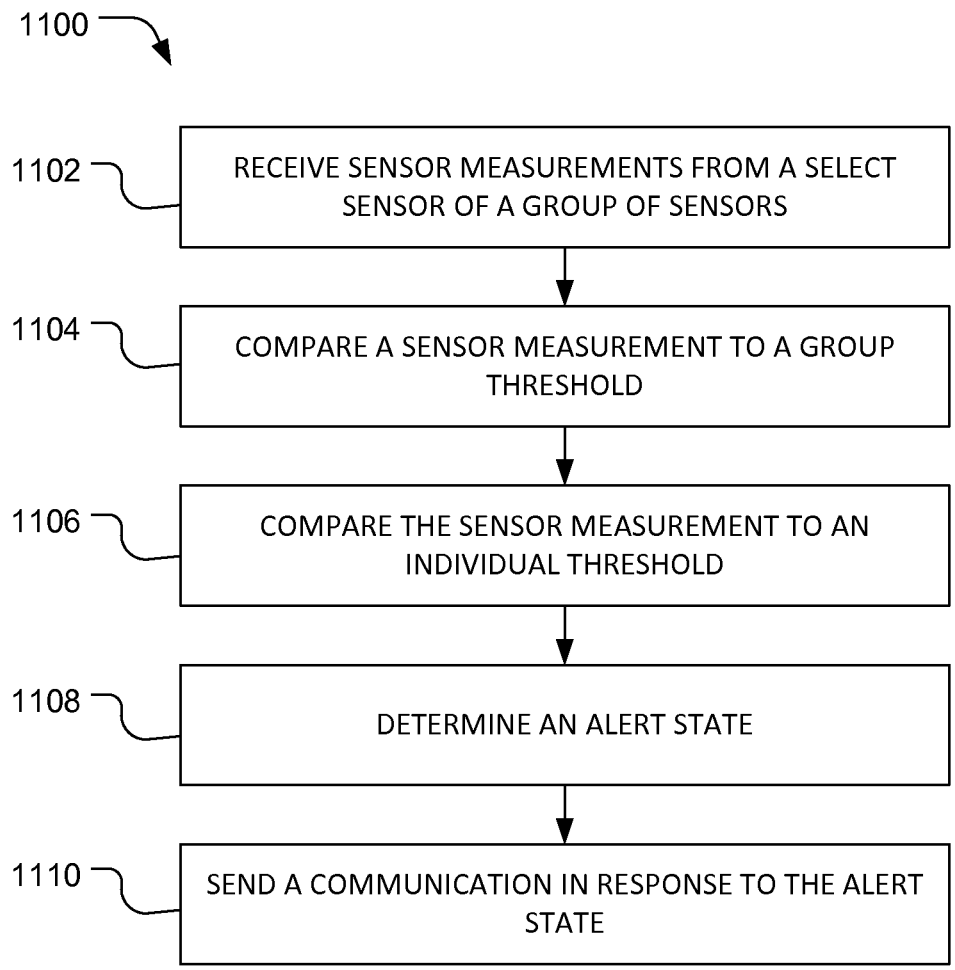

When applied, sensor measurements are received and compared against a group alert condition or individual alert conditions. When an alert state is established, the system can send a communication to a user, such as through a user interface to notify the user of the alert state. For example, as illustrated in FIG. 11, a method 1100 includes receiving sensor measurements from a select sensor of a group of sensors, as illustrated at 1102. A sensor measurement received from a select sensor of the group of sensors can be compared to a group alert condition, such as a group threshold, as illustrated at 1104. The group alert condition can be associated with all sensors within the group of sensors.

As illustrated 1106, the sensor measurement of the select sensor can also be compared to an individual alert condition, such as an individual threshold, associated with the select sensor and optionally not associated with other sensors within the group.

Based on comparison to the group alert condition or the individual alert condition, the monitoring system can determine whether a problem or an alert state exists, as illustrated at 1108. For example, when a sensor measurement violates one of a group threshold or an individual threshold, the monitoring device can identify an alert state.

In response, the monitoring system can activate an alert. For example, in response to identifying an alert state, a communication can be sent to a user, as illustrated at 1110. For example, the monitoring device can send a message, such as a text message, an e-mail, an auditory signal, a phone call, a tweet, a push notification to an application, or a combination thereof, to notify a user of the alert condition. In another example, the monitoring device can initiate the display of an alert condition on a directly connected user interface display or can initiate an alert sound on a directly connected auditory device.

In particular, embodiments of the above methods and systems provide technical advantages, such as more accurate or more precise identification of alert states or quicker identification of alert states. Establishing domains of consistency and associating alert conditions with such domains provides quick notification of operation outside of the norm or of environmental conditions that are unexpected. Further, utilizing a group threshold value and a dynamic individual threshold value associated with the select sensor of the group of sensors provides multiple modes of identifying problems or alert states beyond conventional equipment operating parameters.

The above systems and methods can utilize computational circuitry. Such circuitry can include processors, such as central processing units, or other microprocessors or devices, or combinations thereof. The circuitry can also include or access electronic storage, such as random access memory, read only memory, or persistent storage, in the form of RAM, DRAM, SRAM, ROM, flash memory, optical memory, magnetic storage, or any combination thereof. Such electronic storage can include non-transitory storage of instructions operable by the computational circuitry to implement one or more aspects of the above described systems and methods.

As used herein, "associated" denotes a relationship that can be many to many, one to many, many to one, or one to one. "Uniquely associated" denotes a one to one relationship. For example, an individual alert condition can be uniquely associated with a select sensor. A domain can be uniquely associated with a select sensor or the domain can be associated with sensors of the group of sensors. An individual alert condition can be associated with a domain, for example, when the domain is associated with more than one sensor, or can be uniquely associated with a domain in a one to one relationship when the domain is uniquely associated with a select sensor.

In a first aspect, a method for monitoring sensor measurements includes receiving a sensor measurement from a select sensor of a group of sensors; comparing the sensor measurement to a group threshold associated with the group of sensors; comparing the sensor measurement to an individual threshold uniquely associated with the select sensor of the group of sensors, the individual threshold based on an average and a variance quantity determined from sensor measurements associate with the select sensor and associated with a domain; and activating an alert in response to the comparing.

In an example of the first aspect, activating occurs more accurately than when only comparing to a group threshold.

In another example of the first aspect and the above examples, activating the alert is in response to comparing the sensor measurement to the individual threshold, the comparing to the group threshold not indicating an alert state.

In a further example of the first aspect and the above examples, the domain includes a duration within a period. For example, the period is a day and the domain is a duration intraday.

In an additional example of the first aspect and the above examples, the domain is a duration during which system behavior is expected to be consistent.

In another example of the first aspect and the above examples, the sensor measurement is a temperature measurement, a humidity measurement, a fan speed, a fan usage, a power consumption, a processor usage, network traffic, or a combination thereof.

In a further example of the first aspect and the above examples, the sensor measurement includes a temperature measurement.

In an additional example of the first aspect and the above examples, activating the alert includes sending a communication to a user interface device. For example, the communication is a text message, an email, a tweet, a phone call, a push notification, or a combination thereof.

In another example of the first aspect and the above examples, activating the alert includes initiating a display of the alert state on a user interface display.

In a further example of the first aspect and the above examples, activating the alert includes initiating a sound through an auditory device.

In an additional example of the first aspect and the above examples, the individual threshold associated with the domain is different than a second individual threshold associated with a second domain different from the domain.

In another example of the first aspect and the above examples, a range associated with the individual threshold is not greater than 50% of a range associated with the group threshold. For example, the range is not greater than 20%, such as not greater than 10%.

In a further example of the first aspect and the above examples, activating is in response to comparing to the group threshold.

In a second aspect, a method of monitoring sensor measurements includes receiving sensor measurements from a group of sensors during a domain within a set of periods; establishing a group threshold associated with each of the sensors within the group of sensors; automatically establishing an individual threshold uniquely associated with a select sensor of the group of sensors, the individual threshold based on an average value and a variance quantity determined from sensor measurements associated with the select sensor and associated with the domain within the set of periods; comparing a sensor measurement associated with the select sensor to the group threshold and the individual threshold; and activating an alert in response to the comparing.

In an example of the second aspect, activating the alert is in response to comparing the sensor measurement to the individual threshold, the comparing to the group threshold not indicating an alert state.

In another example of the second aspect and the above examples, the period is a day and the domain is a duration intraday.

In a further example of the second aspect and the above examples, the domain is a duration during which system behavior is expected to be consistent.

In an additional example of the second aspect and the above examples, the sensor measurement is a temperature measurement, a humidity measurement, a fan speed, a fan usage, a power consumption, a processor usage, network traffic, or a combination thereof.

In another example of the second aspect and the above examples, the sensor measurement includes a temperature measurement.

In a further example of the second aspect and the above examples, activating the alert includes sending a communication to a user interface device. For example, the communication is a text message, an email, a tweet, a phone call, a push notification, or a combination thereof.

In an additional example of the second aspect and the above examples, activating the alert includes initiating a display of the alert state on a user interface display.

In another example of the second aspect and the above examples, activating the alert includes initiating a sound through an auditory device.

In a further example of the second aspect and the above examples, the individual threshold associated with the domain is different than a second individual threshold associated with a second domain different from the domain.

In an additional example of the second aspect and the above examples, a range associated with the individual threshold is not greater than 50% of a range associated with the group threshold. For example, the range is not greater than 20%, such as not greater than 10%.

In another example of the second aspect and the above examples, activating is in response to comparing to the group threshold.

In a third aspect, a method of monitoring sensor measurements includes receiving sensor measurements from sensors within a group of sensors during a set of periods; establishing a domain within a period of the set of periods; automatically establishing individual thresholds uniquely associated with each sensor of the group of sensors, the individual thresholds based on an average and a variance quantity determined from sensor measurements associated with the each sensor within the domain within the period; comparing a sensor measurement associated with the domain and uniquely associated with a select sensor of the group of sensors to the uniquely associated individual threshold; and activating an alert in response to the comparing.

In a fourth aspect, a method of monitoring sensor measurements includes receiving sensor measurements from sensors within a group of sensors during a period; establishing a first domain within the period, the first domain having a first duration; automatically establishing first individual thresholds uniquely associated with each sensor of the group of sensors, the first individual thresholds based on an average and a variance quantity determined from sensor measurements associated with the each sensor within the first domain within the period; establishing a second domain within the period, the second domain having a second duration different from the first duration; automatically establishing second individual thresholds uniquely associated with each sensor of the group of sensors, the second individual thresholds based on an average and a variance quantity determined from sensor measurements associated with the each sensor within the first domain within the period.

In a fifth aspect, a system includes a group of sensors; a reader in communication with the group of sensors, the reader to receive sensor measurements from sensors within the group of sensors; and a monitoring device in communication with the reader and to receive the sensor measurements from the reader, the monitor to: receive a sensor measurement from a select sensor of a group of sensors; compare the sensor measurement to a group threshold associated with the group of sensors; compare the sensor measurement to an individual threshold uniquely associated with the select sensor of the group of sensors, the individual threshold based on historical sensor measurements associate with the select sensor and associated with a domain; and activate an alert in response to the comparing.

In a sixth aspect, a method of monitoring sensor measurements includes receiving sensor measurements from a group of sensors during a domain within a set of periods; automatically establishing an individual threshold uniquely associated with a select sensor of the group of sensors, the individual threshold based on historical sensor measurements associated with the select sensor and associated with the domain within the set of periods; comparing a sensor measurement associated with the select sensor to the individual threshold; and activating an alert in response to the comparing.

In a seventh aspect, a method for monitoring sensor measurements includes receiving a sensor measurement from a select sensor of a group of sensors; comparing the sensor measurement to an individual threshold uniquely associated with the select sensor of the group of sensors, the individual threshold based on historical sensor measurements associate with the select sensor and associated with a domain; and activating an alert in response to the comparing.

Examples and feature associated with each of the above aspects can be incorporated, individually or in combination with other examples and features, into other aspects.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for controlling temperature associated with rack-based equipment, the method comprising:
    receiving at a monitoring device via a reader a sensor temperature measurement from a select sensor of a group of sensors, each sensor of the group of sensors uniquely incorporated in a tag associated with rack-based computer equipment, the tag wirelessly communicating the sensor temperature measurement to the reader;
    comparing the sensor temperature measurement to a group threshold associated with the group of sensors;
    for each sensor of the group of sensors and for each domain of time of a plurality of domains of time with a repeating period, comparing the sensor temperature measurement to individual thresholds uniquely associated with the select sensor of the group of sensors, a first domain of time of the plurality of domains of time being a duration of consistency in which backups are performed, a second domain of time of the plurality of domains of time being a duration of consistency in which web traffic increases, the individual thresholds based on a moving average plus or minus a multiple of a variance quantity determined from sensor temperature measurements associate with the select sensor measured during a domain of time of the plurality of domains of time, the individual thresholds having a range bounded by the group threshold; and
    activating a notification when the sensor temperature measurement transgresses an individual threshold of the individual thresholds during the domain of time; and
    activating an alarm condition when the sensor temperature measurement transgresses the group threshold.

2. The method of claim 1, whereby activating occurs more accurately than when only comparing to a group threshold.

3. The method of claim 1, wherein activating the notification is in response to comparing the sensor temperature measurement to the individual thresholds, the comparing to the group threshold not indicating an alarm condition.

4. The method of claim 1, wherein the domain of time includes a duration within the repeating period.

5. The method of claim 4, wherein the period is a day and the domain of time is a duration intraday.

6. The method of claim 1, wherein the domain of time is a duration during which system behavior is expected to be consistent.

7. The method of claim 1, further comprising receiving at the monitoring device a humidity measurement, a fan speed, a fan usage, a power consumption, a processor usage, network traffic, or a combination thereof associated with the rack-based equipment.

8. The method of claim 1, wherein activating the notification includes sending a communication to a user interface device.

9. The method of claim 8, wherein the communication is a text message, an email, a tweet, a phone call, a push notification, or a combination thereof.

10. The method of claim 1, wherein the individual thresholds associated with the domain of time are different than second individual thresholds associated with a second domain of time different from the domain of time.

11. The method of claim 1, wherein the range associated with the individual thresholds is not greater than 50% of a range associated with the group threshold.

12. A method of controlling temperature associated with rack-based equipment, the method comprising:
    receiving, at a monitoring device via a reader, sensor temperature measurements from a group of sensors during a set of domains of time within a set of periods, each domain of time of the set of domains of time repeating in each period of the set of periods, a first domain of time of the plurality of domains of time being a duration of consistency in which backups are performed, a second domain of time of the plurality of domains of time being a duration of consistency in which web traffic increases, each sensor of the group of sensors uniquely incorporated in a tag associated with rack-based computer equipment, the tag wirelessly communicating the sensor temperature measurement to the reader;
    establishing a group threshold associated with each of the sensors within the group of sensors;
    for each sensor of the group of sensors and for each domain of time of the set of domains of time, automatically establishing and updating individual thresholds uniquely associated with a select sensor of the group of sensors, the individual thresholds based on a moving average value plus or minus a multiple of a variance quantity determined from sensor temperature measurements associated with the select sensor measured during the domain of time within the set of periods;
    comparing a subsequent sensor measurement received at the monitoring device via the reader from the tag and associated with the select sensor to the group threshold and the individual thresholds; and
    activating a notification when the subsequent sensor temperature measurement transgresses an individual threshold of the individual thresholds during the each domain of time; and
    activating an alarm condition when the sensor temperature measurement transgresses the group threshold.

13. The method of claim 12, wherein activating the notification is in response to comparing the sensor temperature measurement to the individual thresholds, the comparing to the group threshold not indicating an alarm condition.

14. The method of claim 12, wherein the period is a day and the domain of time is a duration intraday.

15. The method of claim 12, wherein the domain of time is a duration during which system behavior is expected to be consistent.

16. The method of claim 12, further comprising receiving at the monitoring device a humidity measurement, a fan speed, a fan usage, a power consumption, a processor usage, network traffic, or a combination thereof associated with the rack-based equipment.

17. The method of claim 12, wherein activating the notification includes sending a communication to a user interface device.

18. The method of claim 12, wherein the individual thresholds associated with the domain of time are different than second individual thresholds associated with a second domain of time different from the domain of time.

19. A method of controlling temperature associated with rack-based equipment, the method comprising:
    receiving, at a monitoring device via a reader, sensor temperature measurements from sensors within a group of sensors during a set of periods, each sensor of the group of sensors uniquely incorporated in a tag associated with rack-based computer equipment, the tag wirelessly communicating the sensor temperature measurement to the reader;
    establishing a set of domains of time occurring within each period of the set of periods;
    for each sensor of the group of sensors and for each domain of time of the set of domains of time, automatically establishing and updating individual thresholds uniquely associated with the each sensor of the group of sensors, a first domain of time of the plurality of domains of time being a duration of consistency in which backups are performed, a second domain of time of the plurality of domains of time being a duration of consistency in which web traffic increases, the individual thresholds based on a moving average plus or minus a multiple of a variance quantity and plus or minus a constant determined from sensor temperature measurements associated with the each sensor during the each domain of time of the set of domains of time within the set of periods;
    comparing a subsequent sensor temperature measurement associated with the each domain and uniquely associated with a select sensor of the group of sensors to the uniquely associated individual thresholds; and
    activating an alert when the subsequent sensor temperature measurement transgresses an individual threshold of the individual thresholds during the each domain of time.

* * * * *